March 21, 1961     T. L. CLIFT     2,975,998

TUBE-RETAINING BRACKET

Filed July 10, 1957

INVENTOR.
THERLIS L. CLIFT
BY
ATTORNEY

United States Patent Office 2,975,998
Patented Mar. 21, 1961

2,975,998
TUBE-RETAINING BRACKET

Therlis L. Clift, Toledo, Ohio, assignor to The Standard Oil Company, Cleveland, Ohio, a corporation of Ohio Filed July 10, 1957, Ser. No. 671,072

1 Claim. (Cl. 248—68)

The present invention relates to an improved tube-retaining bracket. More particularly, the invention relates to a bracket which is particularly suited for use in securing tubular members such as electrical conduits to supporting members such as poles and the like.

It is the practice in constructing certain electrical power distribution systems to string transmission wires overhead between poles so as to minimize the safety hazards associated with such systems. At locations where the electrical power is needed, conduits are run from the wires at the top of the pole where wires in the conduits connect with the power wires to a header box located near ground level which is provided with various electrical connections so that power may be withdrawn therefrom. The poles used in such systems are circular in cross-section and are usually made of wood, but in some instances the poles are manufactured from steel or other metals. Since the poles are usually of substantial height, means are usually provided to secure the conduit which runs from the top of the pole to the header box at various places along the length of the pole. This is done so as to prevent accidental movement of the conduit which might result in the tearing away of the conduit from the header box as such an occurrence would present a considerable safety hazard.

I have now invented an improved bracket for securing conduits to a pole which comprises a curved backing member adapted to be secured to a support and a tube-retaining member attached to the aforesaid curved member.

My invention will be better understood by reference to the attached patent drawing wherein similar figures denote similar parts throughout and where:

Figure 1:
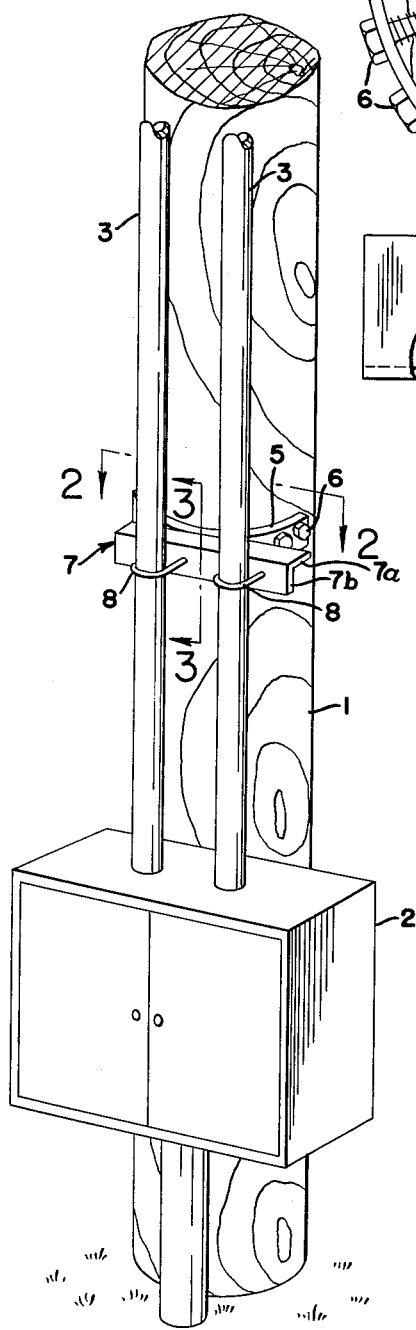
Figure 1 is an isometric view of the tubular retaining bracket of this invention shown in the surroundings in which it may be employed.
Figure 2:
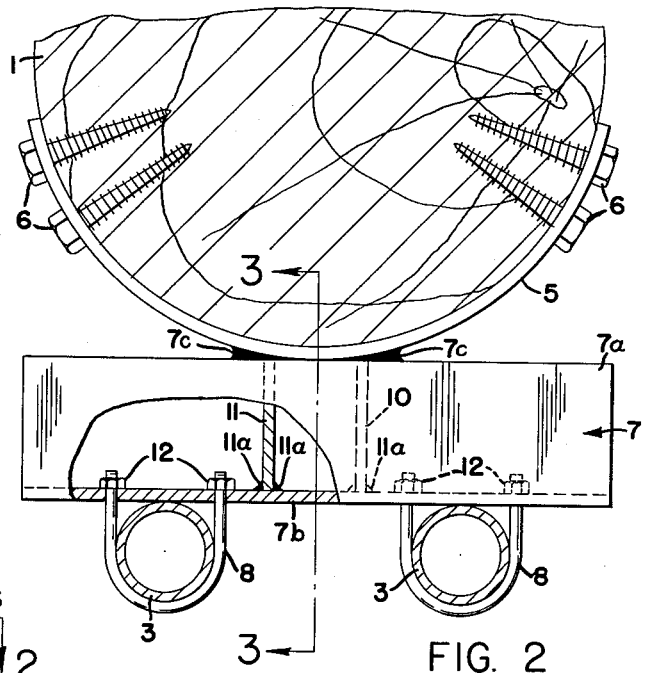
Figure 2 is a top view of the bracket of this invention in partial cross section looking down upon the plane 2—2.

Referring now particularly to Figure 1, a wooden pole 1 is shown which has a header box 2 attached thereto. Conduits 3 lead from the top of the header box 2 to the top of the pole 1. The bracket of this invention comprises a curved backing member 5 which is secured to the pole by means of lag screws 6. The curved member 5 is provided with suitably positioned holes so as to accommodate the lag screws 6 or bolts which secure it to the pole. The curved member 5 has a tube-retaining member 7 attached in symmetrical fashion thereto. The member 7 is angular in shape and it is provided with bolt holes in its face so that U-bolts 8 may be secured thereto. The U-bolts 8 hold the conduits 3 securely against the face of the member 7. The U-bolts are secured to the member 7 by means of the nuts 12 located behind the front face of member 7.

In the preferred embodiment of this invention the tube-retaining member 7 has the shape of an angle iron. The horizontal side 7a of the member 7 is secured to the curved backing member 5 by conventional means such as welding 7c or the like so that the vertical side 7b of the member 7 is spaced from the member 5 but parallel to a plane tangent to the middle of said backing member. This construction leaves an open space between the front or vertical face 7b of the member 7 and the member 5 so that easy access may be had to the nuts 12 which secure the U-bolts 8 to the member 7.

Figure 3:
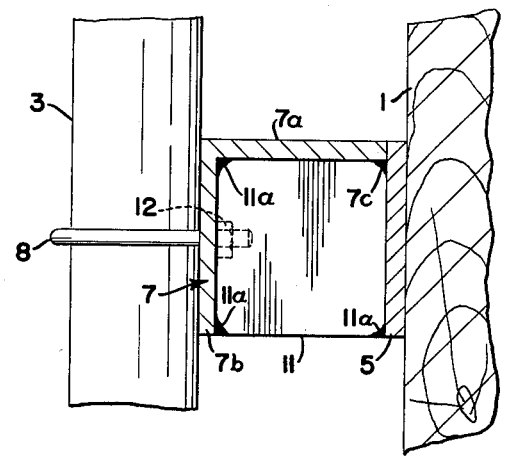
Figure 3 is a cross-sectional sideview of the bracket of this invention looking towards the plane 3—3.

Support webs 10 and 11 may be included in the member 7 to provide extra structural support. The position and shape of the web 11 is more clearly illustrated in Figure 3, but the exact position of the webs is not critical. These webs are secured to the angle iron 7 and the bracket 5 by welding as shown at 11a. Thus, there has been provided a bracket which has particular utility in connection with the mounting of electrical conduits on poles.

The foregoing description of the bracket of this invention is intended to be illustrative of the preferred embodiment of my invention and it is not intended by way of limitation. For example, the angle iron 7 is adapted to accommodate two conduits in the illustration given, but by using a longer piece of angle iron, three or more conduits can be readily accommodated.

Likewise, the curved member 5 is relatively flexible so that it will conform to the shape of the pole on which it is secured. It is generally preferred that the curved member 5 encompass an arc not greater than about 120°, but this is a rough approximation since it is not required that the curved member be perfectly circular as it may be elliptical or even angular in shape. However, the curved member should not completely encompass the pole when it is used in connection with a wooden pole since otherwise it might interfere with the climbing of the pole by maintenance personnel.

Since modifications of my invention will undoubtedly occur to persons skilled in the art, I desire this application for Letters Patent to cover all such modifications of the invention which reasonably fall within the scope of the appended claim.

I claim:

A bracket adapted to secure tubular conduits to the side of a round pole carrying electric transmission means comprising a concave backing member having a plurality of openings in the face thereof, whereby fastening means may be employed to secure said concave backing member to said pole, an angle iron member secured directly to the convex face of said concave backing member so that one face of said angle iron is perpendicular to said backing member and the other face of said angle iron member is spaced apart from said backing member in a plane which is parallel to a plane tangent to the middle of said concave backing member, said last-named face of said angle iron being provided with a plurality of openings to receive U-bolts, a plurality of U-bolts and fastening means associated therewith disposed in said openings of said angle iron face whereby the U-boats may be drawn towards said backing member to clamp a tubular conduit to said angle iron face.

References Cited in the file of this patent

UNITED STATES PATENTS

| 1,671,747 | Seeger | May 29, 1928 |
| 1,802,995 | Williams | Apr. 28, 1931 |
| 2,567,463 | Atkinson | Sept. 11, 1951 |
| 2,765,135 | Chellis | Oct. 2, 1956 |